United States Patent
Plesh, Sr.

(10) Patent No.: US 6,769,528 B2
(45) Date of Patent: Aug. 3, 2004

(54) ROLLERS MOUNTABLE TO A COOLING BED PLATE TRANSFER GRID

(76) Inventor: Ronald L. Plesh, Sr., 31 Hemlock Hill, Orchard Park, NY (US) 14127

( * ) Notice: Subject to any disclaimer, the term of this patent is extended or adjusted under 35 U.S.C. 154(b) by 20 days.

(21) Appl. No.: 10/312,942

(22) PCT Filed: Jun. 29, 2001

(86) PCT No.: PCT/US01/41230
§ 371 (c)(1),
(2), (4) Date: Dec. 30, 2002

(87) PCT Pub. No.: WO02/02439
PCT Pub. Date: Jan. 10, 2002

(65) Prior Publication Data
US 2003/0146065 A1 Aug. 7, 2003

Related U.S. Application Data

(63) Continuation of application No. 09/610,649, filed on Jun. 30, 2000, now abandoned.

(51) Int. Cl.$^7$ ............................................. B65G 13/00
(52) U.S. Cl. ................... 193/35 R; 193/37; 193/35 SS
(58) Field of Search ............................ 193/35 R, 37, 193/35 B, 35 C; 16/255

(56) References Cited

U.S. PATENT DOCUMENTS

| | | | | |
|---|---|---|---|---|
| 2,189,143 A | * | 2/1940 | Harris | 193/35 R |
| 2,391,272 A | * | 12/1945 | Rose | 193/35 R |
| 2,744,758 A | * | 5/1956 | Stokvis et al. | 305/60 |
| 3,252,556 A | * | 5/1966 | Isacsson | 193/37 |
| 3,915,275 A | * | 10/1975 | Specht | 193/35 R |
| 5,265,711 A | * | 11/1993 | Plesh, Sr. | 193/35 R |
| 5,472,179 A | * | 12/1995 | Wendt et al. | 266/279 |
| 5,908,102 A | * | 6/1999 | Plesh, Sr. | 193/35 R |
| 5,921,370 A | * | 7/1999 | Plesh, Sr. | 193/35 R |
| 6,464,062 B1 | | 10/2002 | Wendt et al. | |

* cited by examiner

Primary Examiner—Joe Dillon, Jr.
(74) Attorney, Agent, or Firm—James C. Simmons

(57) ABSTRACT

An inexpensive, high capacity, and easy to install roller (20) for engaging hot metal plates being transferred over a cooling bed plate transfer grid. An invertible block which may have a bearing is provided at each end of the axle (22) for the roller. The bearing block (24) is received in a cut-out in the upper edge of a respective elongate parallel grid member. The bearing block (24) is clamped in the cut-out by a plate which is received in a pair of slots in forward and aft edges of the cut-out to clampingly overlie the bearing block (24).

20 Claims, 3 Drawing Sheets

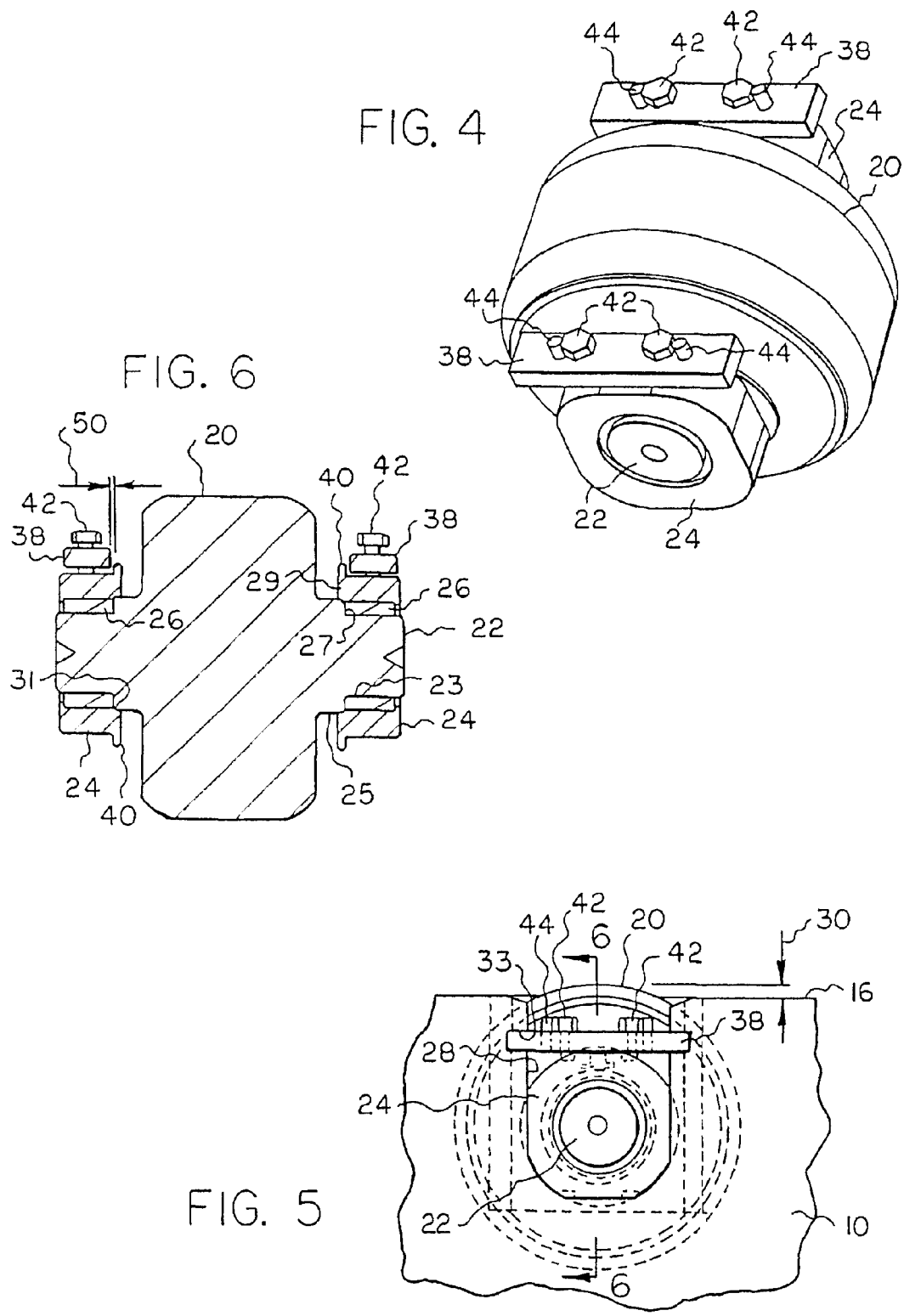

ROLLERS MOUNTABLE TO A COOLING BED PLATE TRANSFER GRID

This is a continuation of application Ser. No. 09/610,649 filed on Jun. 30, 2000 now abandoned.

The present invention relates generally to transfer grids for cooling while transferring hot ferrous and non-ferrous metal plates formed in a plate mill and the like. More particularly, the present invention relates to rollers mounted thereto to engage the plates being transferred so that friction between the plates and the grid is avoided or reduced.

My prior U.S. Pat. Nos. 5,265,711 and 5,301,785, which are hereby incorporated herein by reference, disclose the clamping of roller supporting inserts in transfer grid pockets for moving of the plates over the rollers. The roller is rotatably mounted by means of a bushing on an axle the ends of which are secured in apertures in plates. Members forward and aft of the roller and sandwiched between and welded to the plates form a frame in which the roller is mounted. See also my prior U.S. Pat. Nos. 5,908,102 and 5,921,370 which also dislcose inserts containing rollers for cooling bed plate transfer grids. My prior U.S. Pat. No. 5,908,102 also discloses that the insert is invertible to allow unworn portions of the bearings to experience axle contact whereby the bearing life is increased. See also my PCT application PCT/US97/24259.

It is also considered desirable to have the ability to install the inserts in a grid at a remote location (insert supplier's business location) where suitably skilled workers are available to allow the cooling bed operator to make the changeover more quickly and inexpensively and without the need on site for people skilled in insert installation.

The inserts disclosed in my aforesaid patents have worked well. However, it is considered desirable to provide a less expensive structure for mounting rollers to the grid which is also easy to install and which allows the roller width to be increased to nearly the distance between longitudinal grid members for increased capacity.

The question was raised by a customer whether axles for the rollers could be rotatable in bearing blocks which are received in cutouts in the upper edges of grid members.

U.S. Pat. No. 2,593,089 discloses a conveyor having structural side members having upper edges and between which conveyor rollers are mounted. A bearing allows rotation of each roller on a shaft. The ends of the shaft are received in grooves in the upper edges of retaining strips, which are then slidably engaged in grooves thereby covering the grooves with the shaft ends therein. In an alternative embodiment, each end of the shaft has a bearing which is described, in a teaching away from the present invention, as "pressed into hole 3a instead of a slot in retaining strip 4a." Such a structure does not allow easy installation.

My PCT application PCT/US99/00932 (International Publication no. WO 99/36277, published Jul. 22, 1999) discloses an axle mounting assembly for a vehicle wherein a U-shaped member or yoke defines a vertical upwardly opening slot for receiving an axle, and a block closes the opening to the slot. A wheel is rotatably mounted on the axle.

Other patents which may be of interest are U.S. Pat. Nos. 3,509,978 and 5,472,179.

A data sheet (no. 76.26-01.012, dated 1988) of Glacier GMBH—Deva Werke discloses the use of Deva metal plain bearings for rollers in a cooling bed for sheet steel in a French rolling mill. The pictures and drawing shown thereon appear to show the bearing between the roller and shaft and the shaft ends thus rigidly received in apertures in a respective pair of adjacent elongate members constituting the bed. Again, such a construction would not allow easy installation. In addition, bearings mounted between the roller and shaft wear out faster and are more subject to catastrophic damage when worn than if they were placed at the axle ends.

Accordingly, it is an object of the present invention to provide an inexpensive and easy to install yet reliable structure for securing in cutouts in the upper edges of parallel members of a cooling bed plate transfer grid a pair of bearings disposed in the cutouts for an axle for a roller to be received between the parallel members.

It is still another object of the present invention to be able to allow installation of the rollers in a grid at a remote location.

It is yet another object of the present invention to double or otherwise significantly increase bearing life for great savings to the customer.

It is another object of the present invention to be able to quickly and easily adjust the roller height, including returning the roller height to a desired height to compensate for the effects of wear over time.

In order to secure the bearings in the cutouts, in accordance with the present invention, a bearing is clamped in a cut-out by means of a plate which is received in a pair of slots in forward and aft edges of the cut-out to clampingly overlie the bearing.

Also in accordance with the present invention, means are provided for preventing movement laterally of each bearing, the lateral movement preventing means preferably comprising a lip on the respective bearing which is positioned and sized to abut a lateral surface of a respective grid member and a shoulder on the axle which engages the respective bearing.

In order to double or otherwise significantly increase bearing life for great savings to the customer, the bearing blocks are formed to be symmetrical from top to bottom so as to be invertible.

In order to quickly and easily adjust the roller height, the center of the bearing block aperture (which receives the axle) is offset from the center of the bearing block.

The above and other objects, features, and advantages of the present invention will be apparent in the following detailed description of the preferred embodiment thereof when rad in conjunction with the accompanying drawings wherein the same reference numerals denote the same or similar parts throughout the several views.

BRIEF DESCRIPTION OF THE DRAWINGS

FIG. 4 is a perspective view of one of the rollers.

FIG. 5 is a detail partial side view taken along lines 5—5 of FIG. 3.

FIG. 6 is a sectional view of one of the rollers taken along lines 6—6 of FIG. 5.

DETAILED DESCRIPTION OF THE PREFERRED EMBODIMENTS

Figure 1:
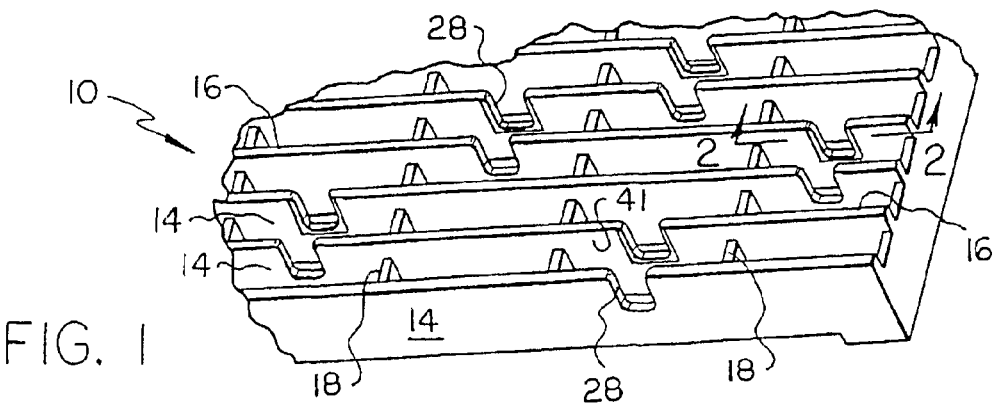
FIG. 1 is a perspective view of a portion of a plate transfer grid which embodies the present invention.
Figure 2:
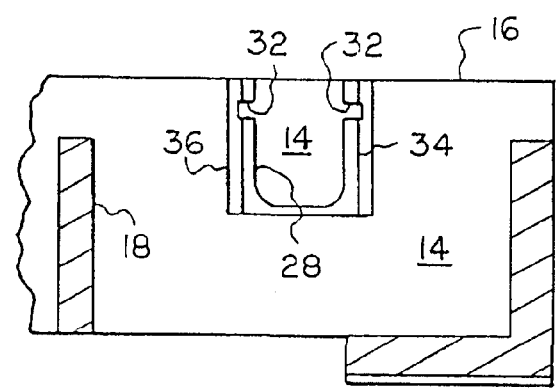
FIG. 2 is a detail partial sectional view thereof taken along lines 2—2 of FIG. 1.
Figure 3:
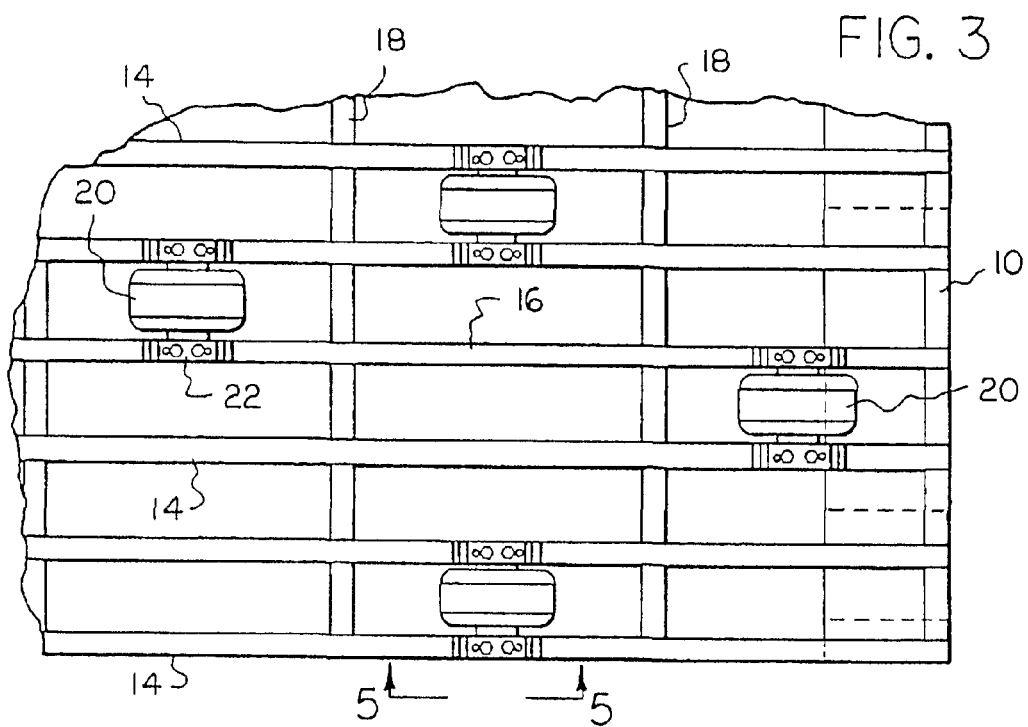
FIG. 3 is a plan view thereof with rollers mounted thereto.

Referring to the drawings, there is illustrated generally at 10 a grid which, with a plurality of like grids, forms a cooling bed for transferring hot ferrous and non-ferrous metal plates and for cooling them by air circulation and the passage of time as they are moved therealong such as by chains or the like. The transfer grid 10 is cast or fabricated as a weldment or otherwise suitably constructed in a single piece of iron or other suitable material and includes a plurality of first parallel portions or members 14 extending in the direction of travel of the plates and providing upper edges or surfaces 16 which, without the rollers described hereinafter, frictionally engage the metal plates for sliding movement of the metal plates there along. The members 14 are supportedly joined by cross-portions or cross-members 18 which extend at right angles thereto. The members 14 project above the cross-members 18 a distance (when members 14 are unworn) of perhaps about ½ inch to provide the supporting surfaces 16 receiving the plates and along which the plates are conveyed from left to right, as seen in FIGS. 1, 2, and 3. The transfer grid 10 as so far described is of a type which is conventional in the art and is described in greater detail in my aforesaid patents. The transfer grid 10 and other like grids, which are side-by-side and in end-to-end relation therewith respectively, are supported by steel beams (not shown) or other suitable supports.

The frictional sliding movement of the metal plates over the surfaces 16 of the members 14 causes wear thereof with the result that frequent replacement of the entire grid has been typically required at high cost. In addition, the under surface of the plates may undesirably be marred as they are conveyed along the grid members 14. In order to reduce such wear and marring, a plurality of rollers 20 (with rounded corners) are mounted in the grid 10, as described hereinafter, for engaging the hot metal plates, such as formed in a plate mill, as they are moved along the grid. The quantity of inserts installed in a grid may vary according to the application or the position of the grid on the cooling bed.

Each roller 20 has an axle 22 which, desirably, is integral therewith (i.e., the roller 20 and axle are desirably a single piece but may if desired be separate pieces with the roller fixedly attached to the axle), and each end of the axle 22 is received in a bearing block, i.e., a roller, sleeve, or ball bearing 26 or other suitable bearing received in a housing 24 (or other suitable bearing means) to allow rotation of the axle 22. A bearing is provided at each end of the axle (instead of between the roller and the axle) to provide reduced wear for longer bearing life and a lesser chance of catastrophic damage when worn.

The axle 22 comprises at each end an axially outer portion 23 which is received in and engaged by the bearing 26 for rotation of the axle 22 and thus the roller 20 and an axially inner enlarged portion 25 joining portion 23 to the roller 20 and defining a shoulder 27. The bearing block housing 24 has an increased inner diameter axially inner portion 29 defining a shoulder 31. Shoulders 31 engage shoulders 27 respectively to limit axial movement of the roller 20 relative to the bearing block housings 24.

A pair of cut-outs, illustrated at 28, are machined or otherwise suitably formed in the upper edges of a pair of adjacent ones of the members 16 and shaped to receive the bearing blocks 24 for each roller 20 with the bearing blocks 24 resting on the bottoms of the respective cutouts 28 and lying below the upper edges 16 for reasons which will become apparent. As seen in FIG. 3, this structure also advantageously allows the rollers 20 to be almost as wide as the distance between the adjacent members 14 so as to maximize their capacity for handling heavy plates as well as to minimize the number of rollers required. Moreover, since the rollers need not be height adjusted but merely secured in position, such a construction also advantageously allows the rollers 20 to be installed in a grid at a remote location by workers unskilled in roller installation. The cutouts 28 have radiused bottom corners to reduce stress concentration areas in the grids. The bearing blocks 24 are fitted suitably (snugly) into the cutouts 28 so as to maintain maximum grid strength, i.e., the cutouts 28 are shaped similarly as the bearing blocks so as to snugly receive the bearing blocks 24. While the bearing blocks 24 (as well as the cutouts 28) are shown to be rectangular (with radiused bottom corners) shaped, they may otherwise be suitably shaped.

The cutouts 28 and rollers 20 are sized so that the rollers 20 project above the upper edges 16 a distance, illustrated at 30 in FIG. 5, of, for example, about ¼ inch.

In order to clamp each of the bearing blocks 24 to its respective member 14, in accordance with the present invention, a pair of slots, illustrated at 32, are machined or otherwise suitably formed in the forward and aft edges, 34 and 36 respectively, of each cutout 28 and the end portions of a rectangular or otherwise suitably shaped plate 38 inserted in the slots 32 respectively so that the plate 38 extends across the cutout 28 to overlie the bearing block with the bearing block received and held between the bottom of the cutout and the plate 38. The bearing block 24 may alternatively be clamped to the grid by, for example, use of various kinds of brackets, without the use of the slots 32.

In order to retain the plate 38 in the slots 32 so that it does not slip laterally, the plate is attached to the bearing block 24 by a pair of screws 42 or by other suitable means. Each screw 42 is received in an aperture in the plate 38 and threadedly received in a threaded aperture in the bearing block housing 24. In order to prevent loosening of each screw 42, a spring pin 44 is suitably inserted in a threaded aperture in the plate 38, after the screw 42 has been tightened, to abut one of the hex faces of the screw head to prevent it from turning.

If desired, an assembly comprising a stationary (non-rotatable) axle and a roller mounted to the axle by means of a bearing may be mounted in and secured to the grid 10. Thus, for example, the stationary axle end portion may be fixedly attached to a housing or block having a shape similar to that of bearing block 24 so that it may be clamped within the cutout 28 by means of clamping plate 38.

Hotter plates, which are softer, require greater support by the rollers to prevent the rollers from marring the plates. Thus, an increased roller footprint can handle hotter plates without such marring. By thusly decreasing the spacing between the roller and the bearing blocks, the likelihood of bearing contamination is also reduced. In order to allow close tolerances between the roller and the grid members 14 (to achieve such a greater footprint) without binding or jamming of the roller against one of the grid members, in accordance with the present invention, means are provided for preventing movement axially of the roller 20. Accordingly, each bearing block portion 29 has an increased outer diameter to define a lip or detent 40 on the axially inner side thereof, the lip diameter being greater than the width of the cutout 28 (or the lip otherwise suitably positioned and shaped) so that the lip 40 may abut the grid member 14 and therefore be restrained from passing through the cutout 28. The spacing, illustrated at 50, between the lip 40 and the respective plate 38 (to allow each of assembly and to prevent binding) is, for example, about 1/16 inch. Thus, the clamping plate 38 is held to the bearing block housing 24 by the screws 42 and spring pins 44. The combination of the plate and bearing block is restrained from axial movement in one direction (axially outwardly) by the lips 40 and in the other direction (axially inwardly) by the shoulders 27. The roller 20 is in turn restrained from movement axially by the bearing block shoulders 31. Thus, the entire roller assembly is restrained from movement axially so that the bearing blocks do not become displaced from the cutouts, and axial thrust is handled by the shoulders 27 so that roller position is advantageously maintained. Other suitable means such as, for example, a tongue and groove or doweled connection or locking shape between the bearing block 24 and grid may alternatively be provided to restrain such axial movement.

Figure 7:
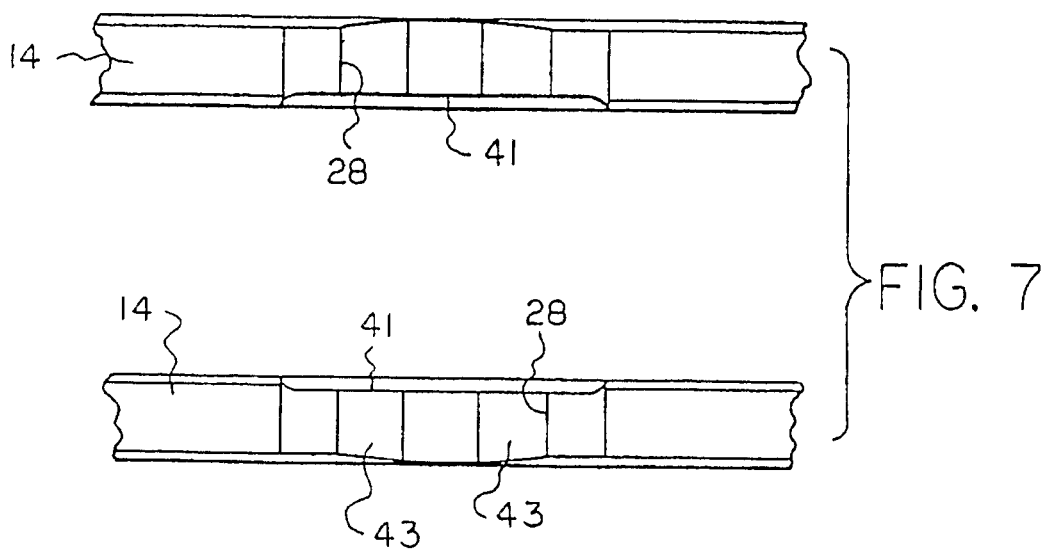
FIG. 7 is an enlarged fragmentary plan view of a pair of adjacent members of the grid.

The following exemplary dimensions and specifications are for the purposes of illustration and not for purposes of limitation. For example, a grid may have a length of about 94¼ inches, a width of about 32 inches, have about 7 members 14 and about 7 support members 16 all equally spaced and having a thickness of about 1 inch, and have about 9 rollers installed therein. Each cutout 28 may have a width of about 3.01 inch, and the distance between the bottom of the cutout and the slots 32 may be about 3.06 inches. Each of the slots 32 may extend a distance of about 0.44 inch into the edge of the member 14 and have a height of about 0.44 inch, and the plate 38 sized accordingly to have a snug fit. The members 14 are machined to control widths of the cutouts 28, as illustrated in FIGS. 1, 2, and 7, in order to provide a precise width for seating of the bearing block 24, thus allowing lip 40 to bear against or abut machined inner surface 41 of member 14 so that an even closer tolerance between the roller and members 14 may be obtained. The bottom corners 43 of the cutouts 28 are suitably radiused (for example, to 1 inch radius). The roller 20 is slightly crowned (for example, a 0.3 inch radius) and rounded at its side edges. The corners between the axle and the roller are also rounded. The roller and axle and the plates 38 may be composed of high heat, shock, and corrosion resistant steel or other suitable material such as steel used for forgings and which retains its hardness to temperatures above 1000 degrees F. The bearing blocks may comprise, for example, high temperature heat treated lubricant transfer type bushings.

In order to quickly and easily and without specialized skill mount and secure a roller 20 in the grid, the bearing blocks 24, with the roller 20 and axle 22 assembled therewith, are inserted in the respective cutouts 28 with the lips 40 adjacent or abutting the surfaces 41 of members 14 respectively. The clamping plates 38 are then inserted in the slots 32 to overlie the bearing blocks 24 respectively, the screws 42 inserted and snugged to a torque of, for example, about 2 to 4 ft. lbs., and the spring pins 44 inserted and appropriately tightened. In addition to being quickly and easily securable in the cutouts, without specialized skill, the roller assembly according to the present invention may be made inexpensively to have a maximum roller width for maximum capacity for handling heavy plates.

In order to increase the bearing block life by as much as double for great savings to the customer, the bearing blocks 24 are constructed to be symmetrical from top to bottom, as best seen in FIG. 4, such that they may be inverted after the bottom portions (those portions exposed to wear) have experienced wear or material removal so as to be worn, whereby the unworn upper portion becomes the bottom portion and carries the load until it also becomes worn.

Figure 8:
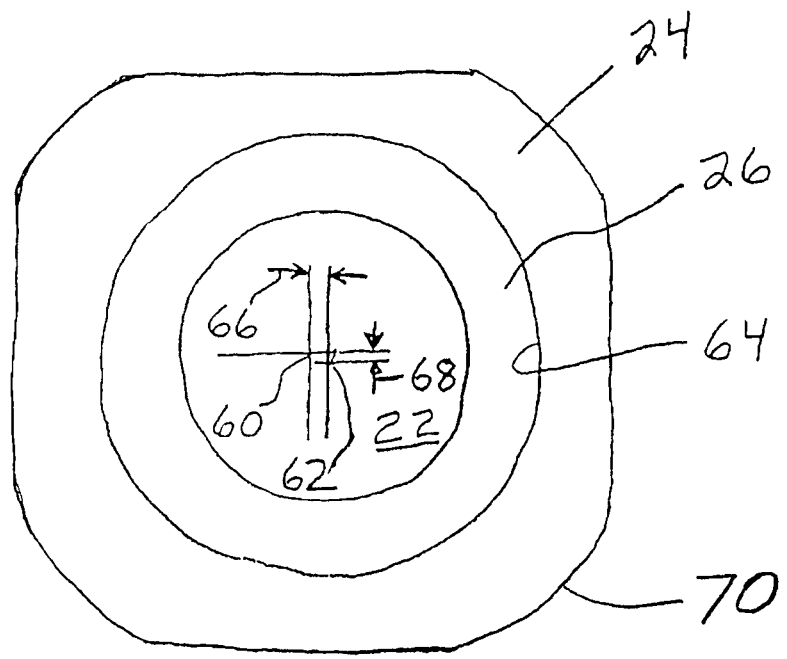
FIG. 8 is a diagrammatic view of a bearing block and axle for one of the rollers and illustrating offset of the center of the bearing block aperture (which receives the axle) from the center of the bearing block.

In order to quickly and easily adjust the roller height, for example, to compensate for the effects of wear so as to maintain the desired roller height 30, the bearing block 24 is a regular polygon (in a plane normal to the axle 22, as illustrated in FIG. 8) or otherwise suitably symmetrically shaped to allow it to be removed from the respective cut-out 28, rotated, and re-inserted therein, and the center of the bearing block aperture (for receiving the axle) is offset from the center of the bearing block. Referring to FIG. 8, the bearing block 24 is preferably square (and may, whether square or rectangular or having more than 4 sides, have rounded corners as illustrated at 70) so as to increase the height adjustment capability (over a non-square rectangular block) as described hereinafter. The center of the bearing block 24 (geometrically, in a plane normal to the axle, as illustrated) is illustrated at 60. As illustrated in FIG. 8, the center (geometrically, in a plane normal to the axle, as illustrated), illustrated at 62, of the aperture, illustrated at 64, for receiving the bearing 26 is offset from the bearing block center 60 in the horizontal direction (as seen in FIG. 8) a distance illustrated at 68. These distances 66 and 68 may, for example, be about 3 mm and 1 mm respectively, which allows the roller height 30 to be adjusted in increments of 2 mm over a total adjustment of about 6 mm by removing the bearing block 24, rotating it 90 or 180 or 270 degrees, and reinserting it, for a total of 4 different height adjustments. The bearing blocks for both ends of the axle should normally be similarly shaped and normally have similarly offsetting apertures. Thus, by rotating the bearing block 24 counter-clockwise 90, 180, and 270 degrees, the roller is respectively raised 4 mm, raised 2 mm, and lowered 2 mm from the position shown.

It should be understood that, while the present invention has been described in detail herein, the invention can be embodied otherwise without departing from the principles thereof, and such other embodiments are meant to come within the scope of the present invention as defined by the claims.

What is claimed is:

1. A cooling bed plate transfer grid comprising a plurality of elongate parallel members having upper edges respectively for effecting movement of plates being cooled, at least one roller, an axle for said roller, a pair of blocks for receiving ends respectively of said axle, a pair of cutouts in said upper edges of a pair of said parallel members for receiving said blocks respectively with said roller received between and projecting above said parallel members for engaging the plates as they are moved along the grid, each of said cutouts having forward and aft edges, a plate for clamping each of said blocks in said respective cutout, and a pair of slots in said forward and aft edges respectively for receiving said clamping plate with said respective block clampingly received below said clamping plate.

2. A grid according to claim 1 further comprising a bearing in each of said blocks in which said axle is rotatably received.

3. A grid according to claim 1 further comprising means for preventing movement axially of said roller.

4. A grid according to claim 3 wherein said axial movement preventing means comprises a lip on each of said blocks, said lip positioned and sized to abut a lateral surface of said respective parallel member, and further comprises a shoulder on said axle for engaging each said block whereby said blocks are restrained from movement axially in one direction by said lips abutting lateral surfaces respectively of said parallel members respectively and in the other direction by said shoulders and whereby said roller is restrained from movement axially relative to said blocks.

5. A grid according to claim 4 further comprising means for attaching said clamping plate to said block.

6. A grid according to claim 5 wherein said attaching means comprises at least one screw and means for preventing loosening of said screw.

7. A grid according to claim 1 further comprising means for attaching said clamping plate to said block.

8. A grid according to claim 7 wherein said attaching means comprises at least one screw and means for preventing loosening of said screw.

9. A grid according to claim 8 wherein said loosening preventing means comprises a spring pin.

10. A cooling bed plate transfer grid comprising a plurality of elongate parallel members having upper edges respectively for effecting movement of plates being cooled, at least one roller, an axle for said roller, a pair of blocks for receiving ends respectively of said axle, a pair of cutouts in said upper edges of a pair of said parallel members for receiving said blocks respectively with said roller received between and projecting above said parallel members for engaging the plates as they move along the grid, a clamp for clamping each of said blocks in said respective cutout, and means for preventing axial movement of said roller.

11. A grid according to claim 10 further comprising a bearing in each said block for rotatably receiving said axle.

12. A grid according to claim 10 wherein said axial movement preventing means comprises a lip on each of said blocks, said lip positioned and sized to abut a lateral surface of said respective parallel member, and further comprises a shoulder on said axle for engaging said respective block whereby said respective block is restrained from movement axially in one direction by said lips abutting lateral surfaces respectively of said parallel members respectively and in the other direction by said shoulder and whereby said roller is restrained from movement axially relative to said blocks.

13. A cooling bed plate transfer grid comprising a plurality of elongate parallel members having upper edges respectively for effecting movement of plates being cooled, at least one pair of cutouts, each having forward and aft edges, in said upper edges of a pair of said parallel members for receiving end portions respectively of an axle for a roller to be received between and to project above said pair of parallel members for engaging the plates as the plates move along the grid, means for clamping an axle end portion in each of said cutouts, said clamping means comprising slots in said forward and aft edges respectively for receiving a plate with a respective axle end portion received below the clamping plate.

14. Apparatus comprising a plurality of elongate parallel members having upper edges respectively, at least one roller, an axle for said roller, a pair of blocks for receiving ends respectively of said axle, a pair of cutouts, each having forward and aft edges, in said upper edges of a pair of said parallel members for receiving said blocks respectively with said roller received between and projecting above said parallel members, and a clamp for clamping each of said blocks in said respective cutout, said clamp comprising a plate and further comprising a pair of slots in said forward and aft edges respectively for receiving said clamping plate with said respective block received below said clamping plate.

15. Apparatus according to claim 14 further comprising a bearing in each of said blocks in which said axle is rotatably received.

16. Apparatus according to claim 15 wherein said bearing is formed to be invertible so that a top and a bottom thereof may be interchanged.

17. Apparatus according to claim 14 further comprising means for preventing movement axially of said blocks.

18. Apparatus according to claim 17 wherein said axial movement preventing means comprises a lip on each of said blocks, said lip positioned and sized to abut a lateral surface of said respective parallel member, and further comprises a shoulder on said axle for engaging each said block whereby said blocks are restrained from movement axially in one direction by said lips abutting lateral surfaces respectively of said parallel members respectively and in the other direction by said shoulders and whereby said roller is restrained from movement axially relative to said blocks.

19. Apparatus according to claim 14 further comprising means for attaching said clamping plate to said block.

20. Apparatus according to claim 19 wherein said attaching means comprises at least one screw and means for preventing loosening of said screw.

* * * * *